Thayer & Hastings,
Check Rein.
No. 104,377.      Patented June 14, 1870.
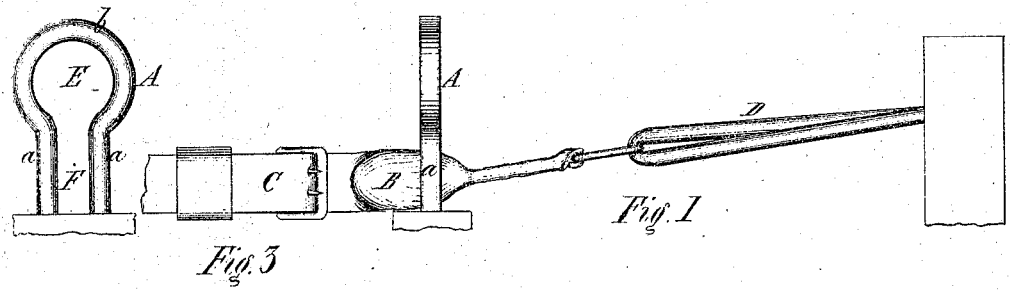
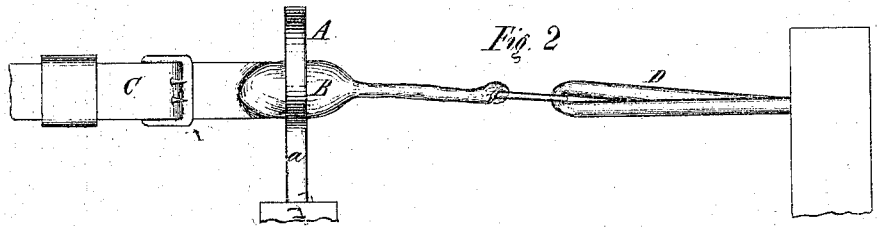
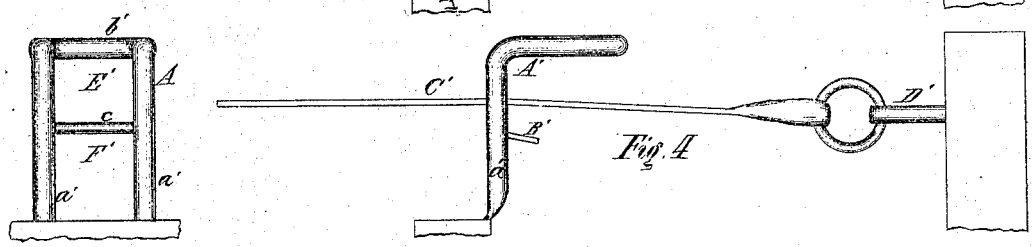
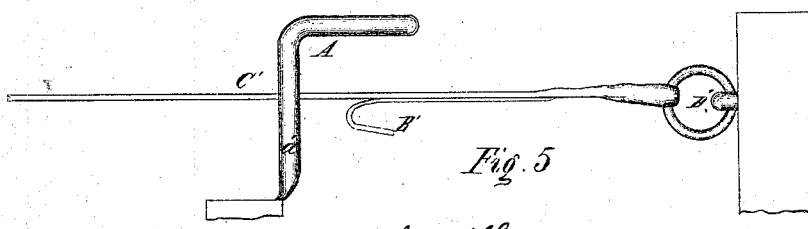

UNITED STATES PATENT OFFICE

ALBERT THAYER AND WILLIAM A. HASTINGS, OF THORNDIKE, MASS.

IMPROVED CHECK-REIN ATTACHMENT.

Specification forming part of Letters Patent No. 104,377, dated June 14, 1870.

*To all whom it may concern:*

Be it known that we, ALBERT THAYER and WILLIAM A. HASTINGS, of Thorndike, in the county of Hampden and State of Massachusetts, have invented a new and useful Improved Check-Rein Attachment; and we do hereby declare the following, when taken in connection with the accompanying drawing and the letters of reference marked thereon, to be a full, clear, and exact description of the said invention, and which said drawing constitutes part of this specification, and represents, in—

Figure 1, a side view of one modification of our invention, with the check-rein drawn back and attached to the water-hook. Fig. 2 is also a side view, representing the line as elevated and the check-rein being let forward. Fig. 3 is a front view of the water-hook.

Our invention is designed to overcome the objections and difficulties incurred in being obliged to get out of and into the carriage every time it is desired to let the horse drink when driving upon the road, especially when it is muddy and wet; and our invention consists of a line to which is attached a protuberance, and one end of this line is attached to the check-rein; and the water-hook is so constructed that the line having the protuberance upon it may be drawn back, and upon being dropped a little the protuberance is caught between the sides of the water-hook and retained.

That others skilled in the art may be able to make and use our invention, we will proceed to describe its construction and the mode of its operation.

In the drawing, A represents the water-hook, having the two uprights or sides $a\ a$, with a narrow space, F, between them, the two sides $a$ being united by the larger part, $b$, having a larger space, E, within it. This is properly secured to the harness in any suitable manner.

D represents the check-rein usually used, to which is attached the line or strap C, and upon which is attached the protuberance B, which may be spherical or cylindrical, as seems most desirable. This protuberance is too large to pass through the space F, between the sides $a\ a$, but will readily pass through the space E, at the upper part of the water-hook.

Its operation is as follows: The line C is passed through the space E, and by pulling steadily upon the line the horse will raise his head, and when he has raised it to a height sufficient to allow the protuberance B to pass through the said space in the water-hook the line C is suddenly dropped, or the pull upon it is suddenly relaxed, and the protuberance B, which should be made of lead or other heavy metal, sewed between two straps or pieces of leather, or otherwise properly secured, being heavy, will suddenly drop down behind the two sides $a\ a$, and the protuberance, being too large to pass forward through the space F, will be retained by the said sides, and the horse's head will be checked up.

The driver may readily let down the check by raising the line C, which extends back within easy reach, and may be connected to the driving-lines, or one of them, or may be attached loosely to the carriage, when the protuberance B will readily pass through the space E, and the check-line will then be released.

It will readily be perceived that the driver may release the check-rein from or attach it to the water-hook without leaving his seat in the carriage.

Having thus described our invention, what we claim as new, and desire to secure by Letters Patent, is—

An improved check-rein attachment, consisting of the line C, having the swell or protuberance B, or its equivalent, attached to the check-rein, in combination with the water-hook A, all constructed and operating substantially as herein described.

ALBERT THAYER.
WM. A. HASTINGS.

Witnesses:
T. A. CURTIS,
C. E. BUCKLAND.